(12) United States Patent
Cook et al.

(10) Patent No.: US 8,956,746 B2
(45) Date of Patent: Feb. 17, 2015

(54) APPARATUS, SYSTEM, AND METHOD FOR BATTERY VENTING CONTAINMENT

(75) Inventors: Derek Kristopher Cook, Research Triangle Park, NC (US); James Mayes Dunbar, Research Triangle Park, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 1771 days.

(21) Appl. No.: 11/158,474

(22) Filed: Jun. 22, 2005

(65) Prior Publication Data

US 2006/0292436 A1    Dec. 28, 2006

(51) Int. Cl.
*H01M 2/12* (2006.01)
*H01M 2/02* (2006.01)

(52) U.S. Cl.
USPC ................................ 429/82; 429/56; 429/176

(58) Field of Classification Search
None
See application file for complete search history.

(56) References Cited

U.S. PATENT DOCUMENTS

| | | | |
|---|---|---|---|
| 4,278,744 A | 7/1981 | Athearn | 429/181 |
| 4,729,933 A | 3/1988 | Oswald | 429/59 |
| 5,350,188 A * | 9/1994 | Sato | 280/739 |
| 5,360,678 A * | 11/1994 | Spillman et al. | 429/6 |
| 5,489,096 A * | 2/1996 | Aron | 273/138.1 |
| 5,567,284 A * | 10/1996 | Bauer et al. | 204/256 |
| 5,641,585 A * | 6/1997 | Lessing et al. | 429/423 |
| 2002/0155343 A1 * | 10/2002 | Cheiky et al. | 429/82 |
| 2003/0017381 A1 | 1/2003 | Mittal et al. | 429/89 |
| 2003/0072992 A1 * | 4/2003 | Okamoto et al. | 429/53 |
| 2004/0185339 A1 | 9/2004 | Jones | 429/177 |

FOREIGN PATENT DOCUMENTS

JP    11191400    7/1999    ............. H01M 2/02

OTHER PUBLICATIONS

Material Safety Data Sheet for Kevlar®.*
Material Safety Data Sheet for Nomex®.*

* cited by examiner

*Primary Examiner* — Alix Echelmeyer
(74) *Attorney, Agent, or Firm* — Kunzler Law Group

(57) ABSTRACT

An apparatus, system, and method are disclosed for battery venting containment that include a battery enclosure configured to contain emissions from one or more battery cells within the enclosure upon a rupture of a case of the one or more battery cells. The battery enclosure includes a first side of the battery enclosure configured to expand upon rupture of the case of the one or more battery cells within the enclosure and a second side of the battery enclosure configured to be rigid.

21 Claims, 6 Drawing Sheets

APPARATUS, SYSTEM, AND METHOD FOR BATTERY VENTING CONTAINMENT

BACKGROUND OF THE INVENTION

1. Field of the Invention

This invention relates to battery enclosures and more particularly relates to battery enclosures to contain emissions from battery cell ruptures.

2. Description of the Related Art

As electronic devices become more compact and sophisticated, an ever increasing number contain batteries. As battery technology has developed, batteries have become more and more compact yielding higher energy densities. To achieve the higher energy densities, various metals and materials are used. Many of the metals and other materials used in batteries are toxic to humans.

Batteries are typically made up of one or more cells. Typically, battery cells are designed to contain the battery electrodes and electrolytes and other materials during normal operation. As battery cells age, they become less efficient and start to degrade. In some cases, as batteries degrade they can overheat. In other cases, batteries are charged or discharged in a way that causes overcharging or overheating. Manufacturing defects may also affect battery performance and cause overheating or degraded operation.

Overcharging, overheating, short circuiting, or other common problems associated with battery use can cause a battery cell to rupture. A rupture of a battery cell can cause venting of hot or noxious gases and other hot metals, materials, or liquids. The rupture may be in the form of an explosion. Fires are also known to result from battery cell ruptures.

Rupturing of battery cells may cause venting into an electronic device of materials that may damage the device. In addition, venting of battery cells due to a rupture may damage furniture, floors, walls or anything with which the battery cell materials come into contact. Rupturing of battery cells can also injure people. Numerous instances have been reported by electronics users of injuries and other property damage, including fire. Rupturing of battery cells has become a major concern in the use of electronics with batteries.

Many batteries with a high energy density create gases during the normal operation of charging and discharging. To deal with the gases created during normal operation, some battery makers have created battery cells that expand to contain the gases and then contract. The battery cells are not designed to contain a more violent venting of battery materials which typically cause the battery cells to rupture. Other designs for battery cells take into account the natural forces of pressure from change in altitude or submersion in water such as a lake or ocean. None of the battery cell designs for pressure variations or gas creation are designed to withstand battery venting such as explosion due to overcharging, overheating, etc.

Some rigid battery enclosures are designed to withstand battery cell rupture and venting while preventing emissions to the exterior of the enclosure. The enclosures include thick walls, heavy materials such as steel, or other precautions to contain the emissions from a battery cell rupture. Such rigid enclosures are typically heavier or more expensive than battery enclosures not designed to withstand and contain battery cell rupture.

From the foregoing discussion, it should be apparent that a need exists for an apparatus, system, and method for battery venting containment. Beneficially, such an apparatus, system, and method would withstand the forces associated with battery cell venting and rupture while containing emissions by expanding. The apparatus, system, and method would allow a battery enclosure to expand in one or more chosen directions that may be safer than expansion in other directions. The apparatus, system, and method may also allow a controlled discharge of gaseous emissions to reduce pressure within a battery enclosure after a battery cell rupture.

SUMMARY OF THE INVENTION

The present invention has been developed in response to the present state of the art, and in particular, in response to the problems and needs in the art that have not yet been fully solved by currently available battery enclosures. Accordingly, the present invention has been developed to provide an apparatus, system, and method for battery venting containment that overcome many or all of the above-discussed shortcomings in the art.

The apparatus for battery venting containment is provided with the elements necessary for containing the emissions following a battery cell rupture. The apparatus in the described embodiments includes a battery enclosure that contains emissions from one or more battery cells within the enclosure upon a rupture of a case of the one or more battery cells. The battery enclosure includes a first side of the battery enclosure that expands upon rupture of the case of the one or more battery cells within the enclosure and a second side of the battery enclosure configured to be rigid.

The battery enclosure, in one embodiment, is fire resistant. In another embodiment, the battery enclosure is resistant to explosion of one or more battery cells within the battery enclosure. In another embodiment, the emissions include gases, solids or liquids. The battery enclosure, in one embodiment, is at least partly formed of Nomex®. In another embodiment, the battery enclosure is at least partly formed of Kevlar®.

In an alternate embodiment, the apparatus may be configured to include an emissions venting mechanism. In one embodiment, the emissions venting mechanism is a valve. In another embodiment, the emissions venting mechanism is a restricted orifice. In yet another embodiment, the emissions venting mechanism is a material porous to at least a portion of the emissions.

In one embodiment, the battery cells are high energy cells. In another embodiment, the battery cells are lithium-ion battery cells. In another embodiment, the battery cells are nickel cadmium battery cells. In yet another embodiment, the battery cells are nickel-hydrogen battery cells.

In one embodiment, the battery enclosure includes electrical terminals, where the electrical terminals are connected to the one or more battery cells and extending to the exterior of the battery enclosure and the electrical terminals are sealed to the battery enclosure. In another embodiment, the one or more expandable sides are pleated and the pleats expand to contain the emissions. In another embodiment, the one or more expandable sides are rolled and unroll to contain the emissions. In yet another embodiment, the battery enclosure expands to contain the emissions and does not contract to the pre-expansion shape.

A system of the present invention is also presented for battery venting containment. The system may be embodied by an electronic device and a battery connected to the electronic device. The battery includes a battery enclosure that contains emissions from one or more battery cells within the enclosure upon a rupture of the case of the one or more battery cells. The battery enclosure includes a first side of the battery enclosure configured to expand upon rupture of the case of the one or more battery cells within the enclosure and a second side of the battery enclosure configured to be rigid.

In one embodiment, the battery enclosure is fire resistant. In another embodiment, the battery enclosure is resistant to explosion of one or more battery cells within the battery enclosure. In an alternate embodiment, the battery enclosure includes an emissions venting mechanism. In yet another embodiment, the battery enclosure includes electrical terminals, where the electrical terminals are connected to the one or more battery cells and extend to the exterior of the battery enclosure and the electrical terminals are sealed to the battery enclosure.

A method of the present invention is also presented for battery venting containment. The method in the disclosed embodiments substantially includes the steps necessary to carry out the functions presented above with respect to the operation of the described apparatus and system. In one embodiment, the method includes providing a battery having a battery enclosure and attaching the battery to an electronic device. The battery enclosure contains emissions from one or more battery cells within the enclosure upon a rupture of a case of the one or more battery cells and the battery enclosure includes a first side of the battery enclosure configured to expand upon rupture of the case of the one or more battery cells within the enclosure and a second side of the battery enclosure configured to be rigid.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
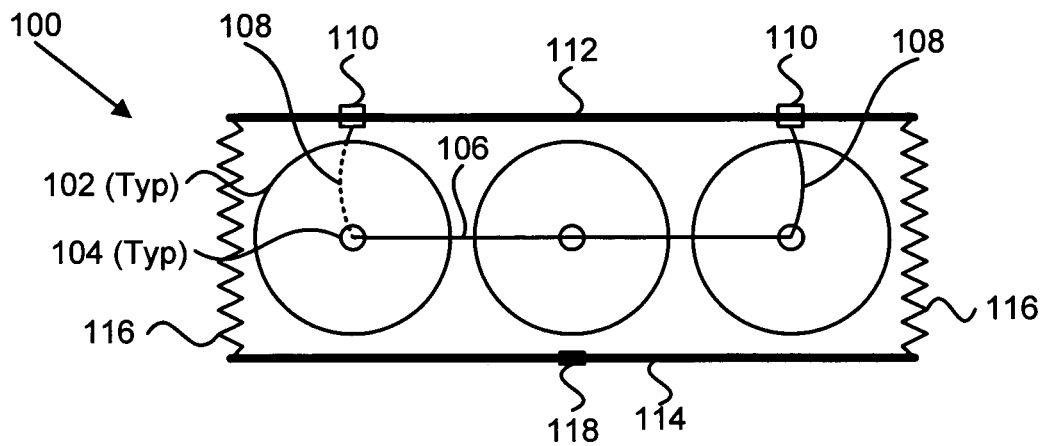
FIG. 1a is a side section view a battery enclosure for battery venting containment in accordance with the present invention.
Figure 1B:
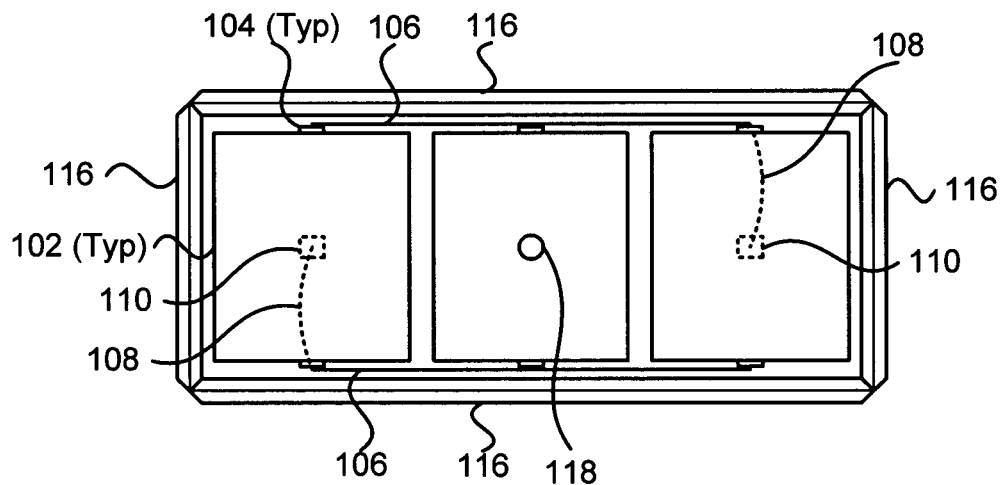
FIG. 1b is a top section view a battery enclosure for battery venting containment in accordance with the present invention.
Figure 1C:
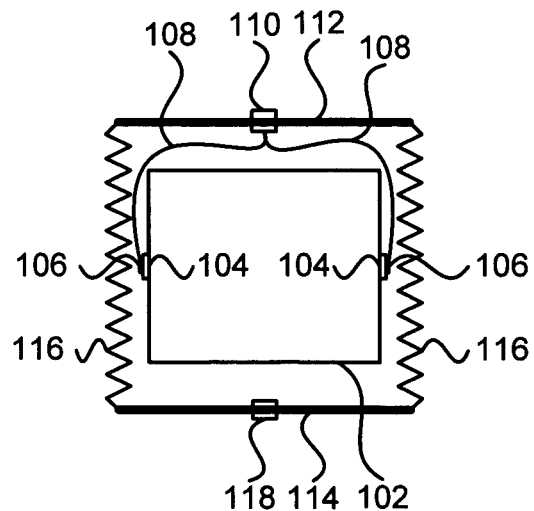
FIG. 1c is a front section view of a battery enclosure for battery venting containment in accordance with the present invention.

FIG. 1 depicts a battery enclosure 100 for battery venting containment in accordance with the present invention. FIG. 1a depicts a side section view of the battery enclosure 100. FIG. 1b depicts a top section view of the battery enclosure 100. FIG. 1c depicts a front section view of the battery enclosure 100. The embodiment depicted in Figure may be from the perspective of a laptop user with a battery positioned to expand out of the bottom of the laptop.

A typical battery enclosure 100 contains one or more battery cells 102. The battery enclosure 100 of in FIG. 1 is depicted with three battery cells 102, but any number of cells can be included and the battery cells 102 may be of any shape. In one embodiment, the battery cells 102 are high energy density cells such as lithium-ion, nickel-hydrogen, or nickel-cadmium. Typically, high energy density battery cells have a higher potential for damage upon rupture. In another embodiment, the battery cells 102 are not high energy density batteries.

A typical battery cell 102 includes battery terminals 104. The battery cells 102 in FIG. 1 are depicted with battery terminals 104 on the sides. In another embodiment, the battery terminals 104 are all on one side of a battery cell 102. In another embodiment, the battery terminals 104 are on the ends of a battery cell 102. One skilled in the art will recognize other battery cell 102 terminal locations that may be used with the present invention.

Battery cells 102 within a battery enclosure 100 typically include an electrical connection between the battery terminals 104 and the exterior of the battery enclosure 100. In one embodiment, the battery terminals are connected together with an electrical connector 106. Another section of electrical connector 108 connects the batteries with a battery enclosure terminal 110. FIG. 1 depicts battery enclosure terminals 110 on the top of the battery enclosure 100 with one electrical connector 108 extending from the battery terminals 104 on one side and other electrical connector 108 extending from the battery terminals 104 on the other side. In another embodiment, electrical connectors 108 extend through the battery enclosure 100. The electrical connectors 106, 108 in one embodiment are wires. In another embodiment, the electrical connectors 106, 108 are bus bars. In yet another embodiment, the electrical connectors 106, 108 are a combination of wires and bus bars. Any electrical connector 106, 108 capable of connecting to battery terminals 104 and extending to the exterior of the battery enclosure may be compatible with the present invention.

In one embodiment, the battery enclosure terminals 110 are sealed to the battery enclosure 100 to not intentionally allow any emissions from a battery cell 102 rupture to pass to the exterior of the battery enclosure 100. In yet another embodiment, a connection between the battery enclosure 100 and a battery terminal 110, an electrical connector 108, or the like is designed to integrate a mechanism to allow controlled emissions from a battery cell 102 rupture to the exterior of the battery enclosure 100. One skilled in the art will recognize other designs to seal a battery enclosure 100 to a battery terminal 110, an electrical connector 108, or the like.

FIG. 1 depicts a battery enclosure 100 with a solid top wall 112, a solid bottom wall 114, and expandable side walls 116. In the depicted embodiment, upon battery cell 102 rupture, the side walls 116 expand to contain the rupture. In one embodiment, the expandable walls 116 are pleated to allow expansion. In other embodiment, the expandable walls 116 are rolled and unroll in response to a battery cell 102 rupture. In another embodiment, at least one wall of the battery enclosure 100 is a combination of expandable and rigid materials.

In another embodiment, the expandable walls 116 and possibly any other walls are constructed allow expansion of the battery enclosure 100 in a controlled direction after a battery cell 102 rupture. In another embodiment, the battery enclosure 100 expands in a safe direction, which may be in a direction away from a user. In yet another embodiment, the expandable walls 116 are contained by a solid wall or in a sleeve to direct the expansion in a particular direction. One skilled in the art will recognize other battery enclosure 100 materials for the expandable walls 116 and other walls 112, 114.

In another embodiment, the battery enclosure 100 includes a single expandable wall 116 that balloons out after a battery cell 102 rupture. In other embodiment, three adjacent walls are expandable 116 and connected to a solid wall 114 that is hinged to the other walls, thus allowing the solid wall 114 to rotate along the hinge while the expandable walls 116 expand. One skilled in the art will recognize other configurations of a battery enclosure 100 with expandable walls 116 to contain the emissions from a battery cell 102 rupture.

In one embodiment, the expandable walls 116 and possibly other walls are made of some fire resistant material. In another embodiment, the expandable walls 116 and possibly other walls are made of Nomex®. In another embodiment, the expandable walls 116 and possibly other walls are made of Kevlar®. In other embodiment, the expandable walls 116 and possibly any other walls are constructed to withstand a battery cell 102 rupture. In another embodiment, the expandable walls 116 and possibly other walls are made of a material that will stretch to contain the emissions from a battery cell 102 rupture. One of skill in the art will recognize other materials or combination of materials for the expandable walls 116 and other walls 112, 114 of a battery enclosure 100 that will contain the emissions from a battery cell 102 rupture. In one embodiment, the battery enclosure 100 expands after rupture of at least one battery cell 102, but does not contact to its original position.

In an alternate embodiment, the battery enclosure 100 includes a venting mechanism 118 to vent battery cell 102 emissions after a battery cell 102 rupture to reduce pressure within the battery enclosure 100. The venting mechanism 118 may be a valve, a restricted orifice, a membrane porous to at least some battery cell rupture emissions, or the like. The venting mechanism 118 may allow emissions at a controlled rate after the battery enclosure 100 with some expandable walls 116 has contained the initial emissions after a battery cell 102 rupture. The venting mechanism 118 may be located anywhere on the battery enclosure 100, but may be located to vent battery cell 102 emissions away from a user. One of skill in the art will recognize other venting mechanism 118 locations and types to allow a controlled release of emissions from a battery cell 102 rupture.

Figure 2A:
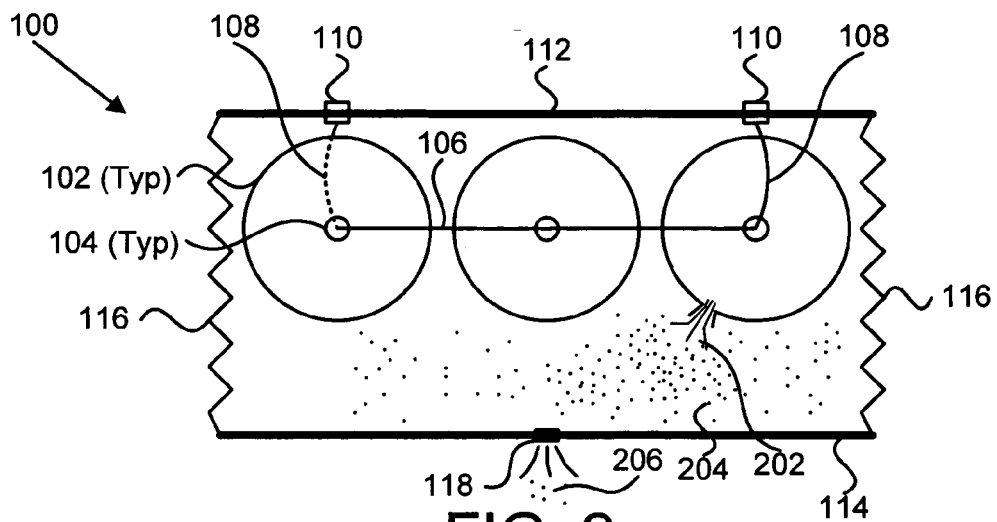
FIG. 2a is a side section view a battery enclosure for battery venting containment after a battery cell rupture in accordance with the present invention.
Figure 2B:
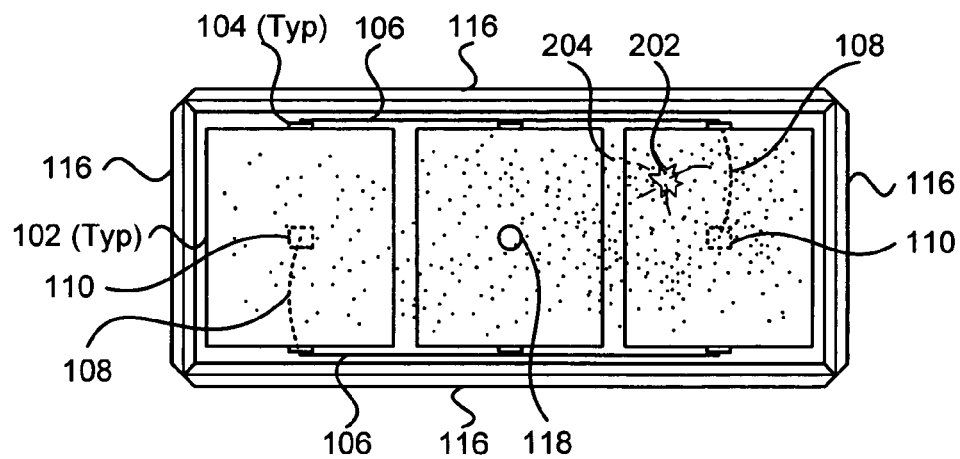
FIG. 2b is a top section view a battery enclosure for battery venting containment after a battery cell rupture in accordance with the present invention.
Figure 2C:
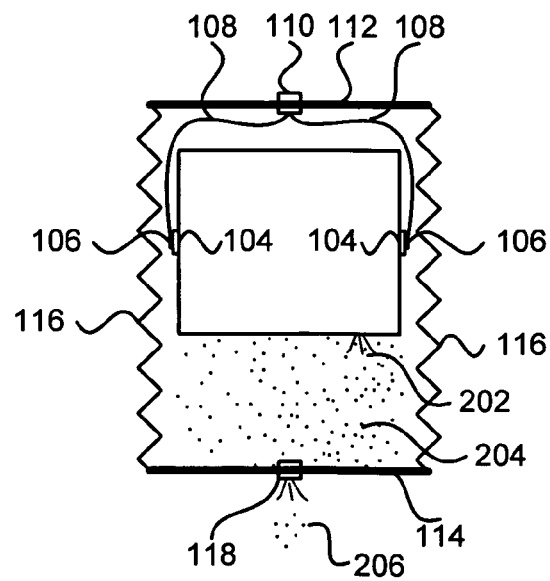
FIG. 2c is a front section view of a battery enclosure for battery venting containment after a battery cell rupture in accordance with the present invention.

FIG. 2 depicts the battery enclosure 100 of FIG. 1 after a battery cell 102 rupture 202. FIG. 2a depicts the side section view of the battery enclosure 100. FIG. 2b depicts the top section view of the battery enclosure 100. FIG. 2c depicts a front section view of the battery enclosure 100. After a battery cell 102 rupture 202, battery cell emissions 204 vent into the battery enclosure 100. The expandable walls 116 of the battery enclosure 100 expand in at least one direction and contain the emissions from the battery cell 102 rupture. In one embodiment, a venting mechanism 118 allows some emissions 206 to vent to the outside of the battery enclosure 100.

Figure 3A:
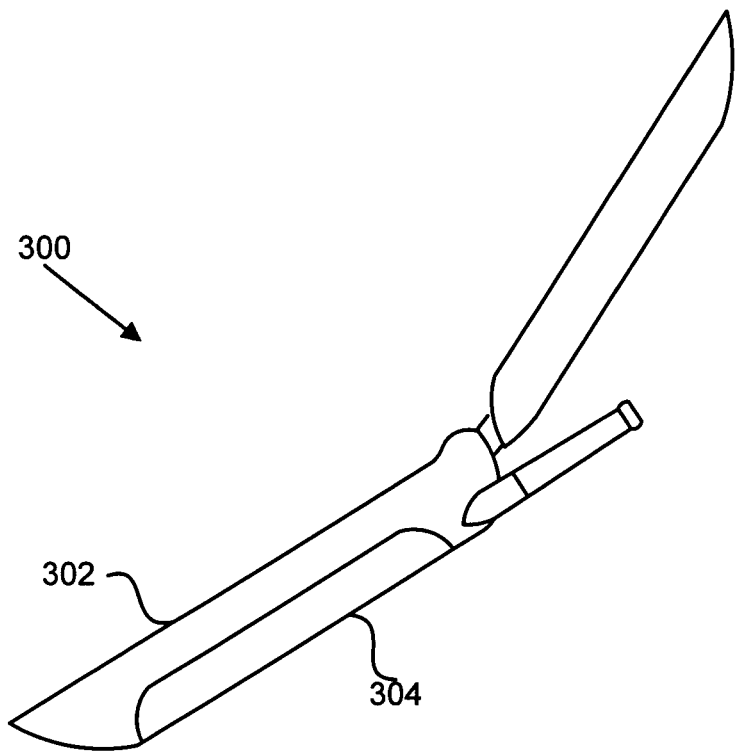
FIG. 3a is a side view of a battery enclosure for battery venting containment in a cell phone in accordance with the present invention.
Figure 3B:
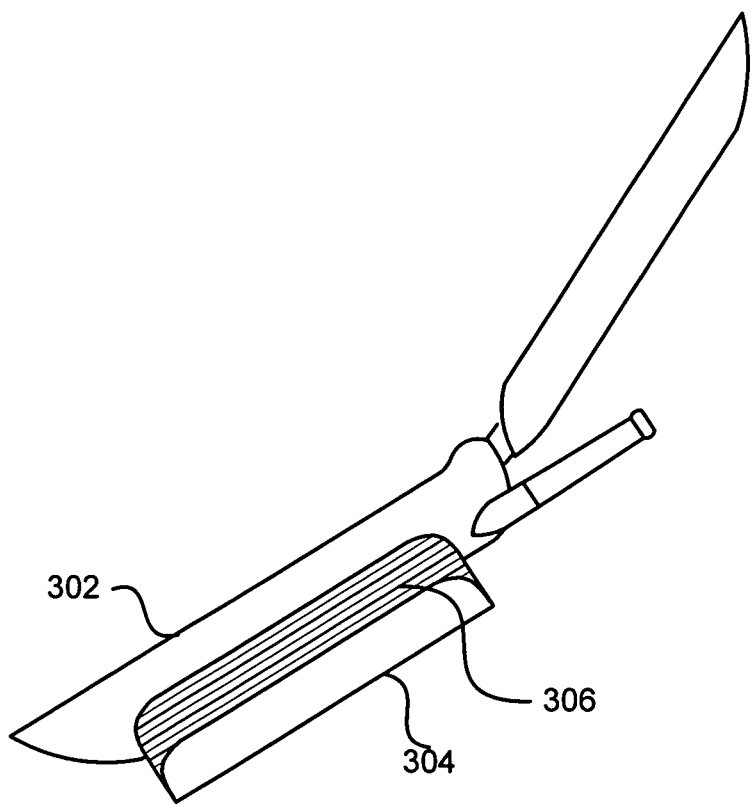
FIG. 3b is a side view of a battery enclosure for battery venting containment in a cell phone after a battery cell rupture in accordance with the present invention.

FIG. 3 is a schematic block diagram of a system for battery venting containment in accordance with the present invention. The particular system of FIG. 3 is implemented in a cell phone 300. FIG. 3a depicts the cell phone 300 prior to a battery cell 102 rupture 202. FIG. 3b depicts the cell phone 300 after a battery cell 102 rupture 202.

The cell phone 300 includes a cell phone body 302 with a cell phone battery 304 attached. The cell phone battery 304 includes a battery enclosure 100 and at least one battery cell 102. The cell phone battery 304 includes some type of electrical connection 106, 108 between the battery cell terminals 104 and the exterior of the battery enclosure 100. In one embodiment, the cell phone battery 304 includes battery enclosure terminals 110 to connect to the cell phone body 302. The battery enclosure 100 also includes at least one expandable wall 116, 306. The depicted cell phone battery 304 includes a solid bottom wall 114 (depicted as the wall away from the cell phone body 302). After a battery cell 102 rupture 202, the cell phone battery 304 expands away from the cell phone body 302 and contains the emissions 204 from a battery cell 102 rupture 202.

In an alternate embodiment, the cell phone battery 304 includes a venting mechanism 118. In another embodiment, the cell phone battery 304 is allowed to expand into a cavity within the cell phone body 302. In another embodiment, three walls of the battery 304 are expandable 116 and the front wall 114 hinges away from the cell phone body 302. In yet another embodiment, the front wall of the battery 304 is expandable 116 and expands away from the cell phone body 302. One skilled in the art will recognize other configurations of a cell phone battery 304 that include at least one expandable wall 116 or section of a wall to contain emissions 204 from a battery cell 102 rupture 202.

Figure 4A:
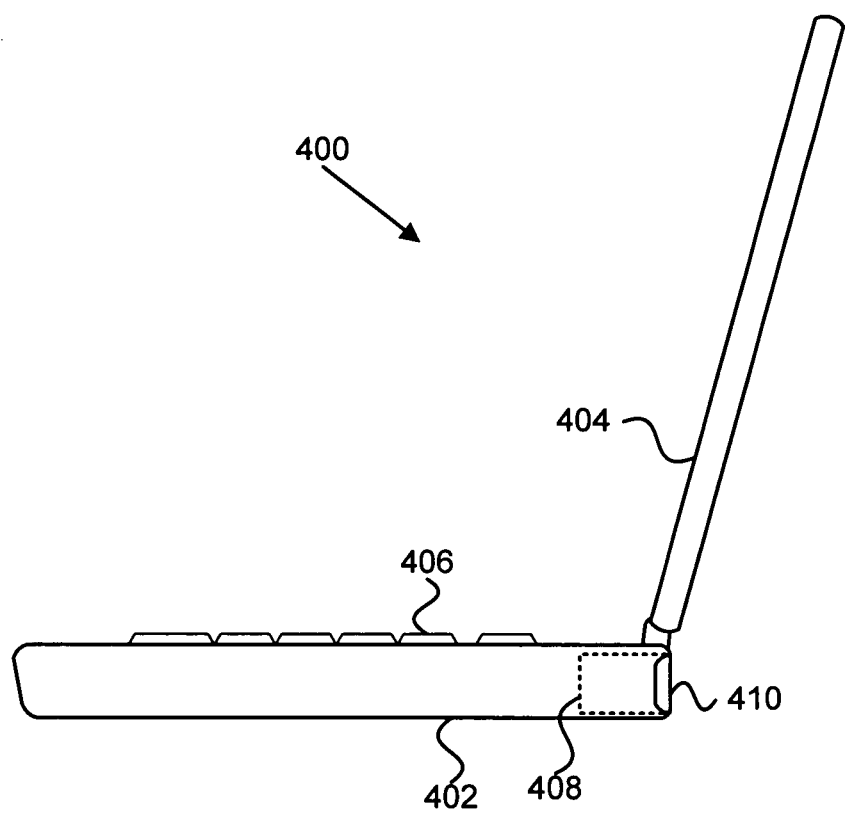
FIG. 4a is a battery enclosure for battery venting containment in a laptop computer in accordance with the present invention.
Figure 4B:
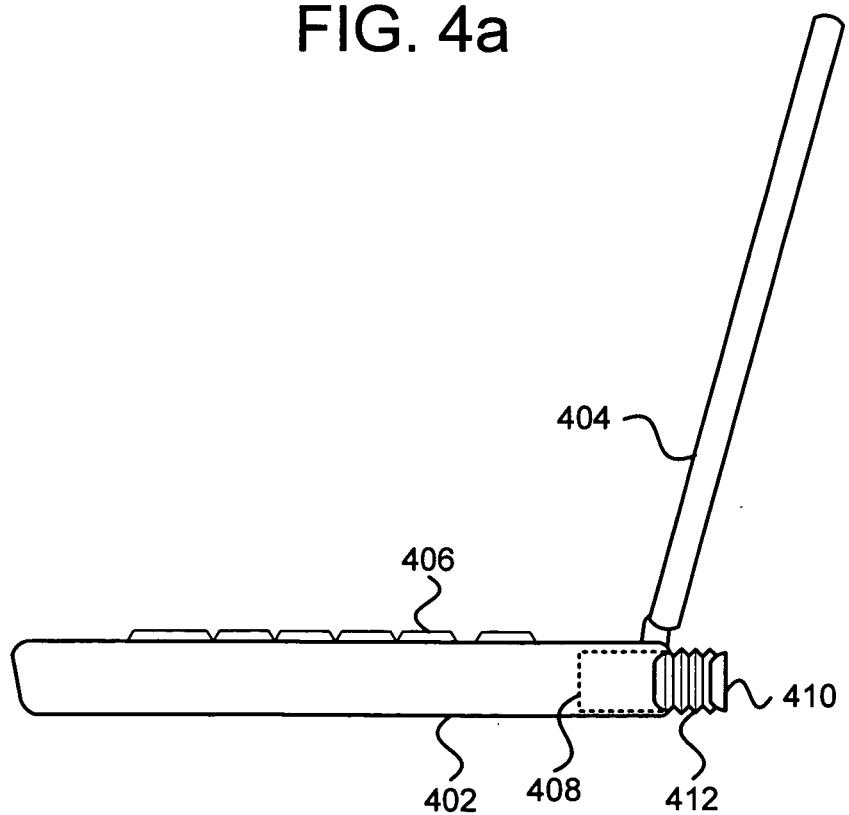
FIG. 4b is a battery enclosure for battery venting containment in a laptop computer after a battery cell rupture in accordance with the present invention.

FIG. 4 is a schematic block diagram of another system for battery venting containment in accordance with the present invention. The particular system of FIG. 4 is implemented in a laptop computer 400. FIG. 4a depicts the laptop computer 400 prior to a battery cell 102 rupture. FIG. 4b depicts the laptop computer 400 after a battery cell 102 rupture.

The laptop computer 400 includes a laptop computer body 402 with a screen 404 and keypad 406 and a laptop battery 408. The laptop battery 408 includes a battery enclosure 100 and at least one battery cell 102. The laptop battery 408 includes some type of electrical connection 106, 108 between the battery cell terminals 104 and the exterior of the battery enclosure 100. In one embodiment, the laptop battery 408 includes battery enclosure terminals 110 to connect to the laptop computer body 402. The battery enclosure 100 also includes at least one expandable wall 116, 412. The depicted laptop battery 408 includes a solid back wall 410 (depicted as the wall away from the laptop body 402). After a battery cell 102 rupture 202, the laptop battery 408 expands away from the laptop computer body 402 and contains the emissions 204 from a battery cell 102 rupture 202.

In an alternate embodiment, the laptop battery 408 includes a venting mechanism 118. In another embodiment, the laptop battery 408 is allowed to expand into a cavity within the laptop computer body 402. In another embodiment, three walls of the laptop battery 408 are expandable 116 and the back wall 410 hinges away from the laptop computer body 402. In yet another embodiment, the back wall of the laptop battery 408 is expandable 116 and expands away from the laptop computer body 402. One skilled in the art will recognize other configurations of a laptop battery 408 that include at least one expandable wall 116 to contain emissions 204 from a battery cell 102 rupture 202.

Figure 5A:
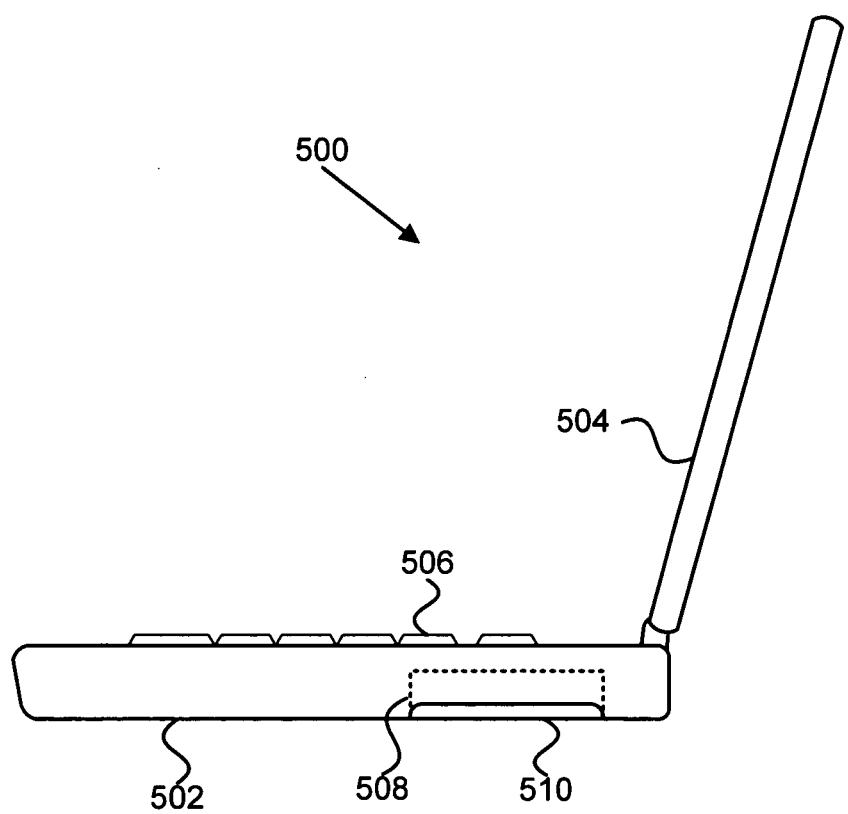
FIG. 5a is an alternate battery enclosure for battery venting containment in a laptop computer in accordance with the present invention.
Figure 5B:
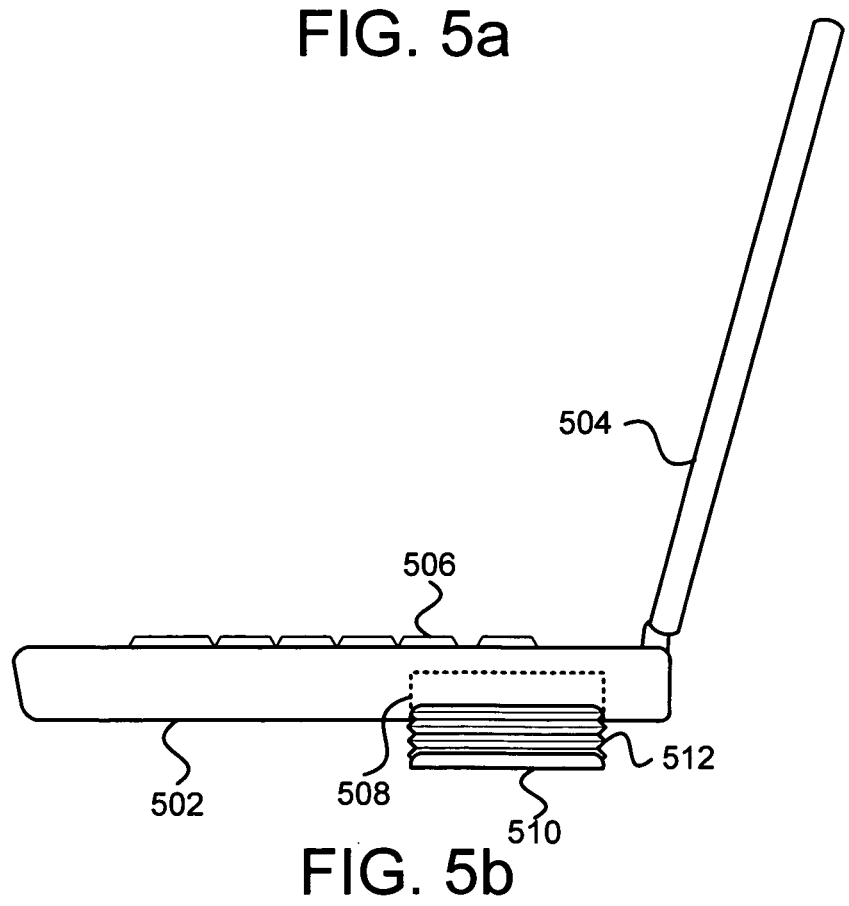
FIG. 5b is an alternate battery enclosure for battery venting containment in a laptop computer after a battery cell rupture in accordance with the present invention.

FIG. 5 is a schematic block diagram of another system for battery venting containment in accordance with the present invention. The particular system of FIG. 5 is similar to the laptop depicted in FIG. 4 with a battery venting containment system designed to expand primarily out of the bottom of the laptop computer. FIG. 5a depicts the laptop computer 500 prior to a battery cell 102 rupture. FIG. 5b depicts the laptop computer 500 after a battery cell 102 rupture.

The laptop computer 500 includes a laptop computer body 502 with a screen 504 and keypad 506 and a laptop battery 508. The laptop battery 508 includes a battery enclosure 100 and at least one battery cell 102. The laptop battery 508 includes some type of electrical connection 106, 108 between the battery cell terminals 104 and the exterior of the battery enclosure 100. In one embodiment, the laptop battery 508 includes battery enclosure terminals 110 to connect to the laptop computer body 502. The battery enclosure 100 also includes at least one expandable wall 116, 512. The depicted laptop battery 508 includes a solid bottom wall 510 (depicted as the wall away from the laptop body 502). After a battery cell 102 rupture 202, the laptop battery 508 expands away from the laptop computer body 402 and contains the emissions 204 from a battery cell 102 rupture 202.

The systems depicted in FIGS. 3, 4 and 5 are three embodiments of a system of the present invention. The present invention may include any system with an electronic or electrical device that includes a battery where the battery has a battery enclosure 100 that expands to contain emissions from a battery cell 102 rupture. One skilled in the art will recognize other electronic or electrical devices with a battery suitable for the present invention.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
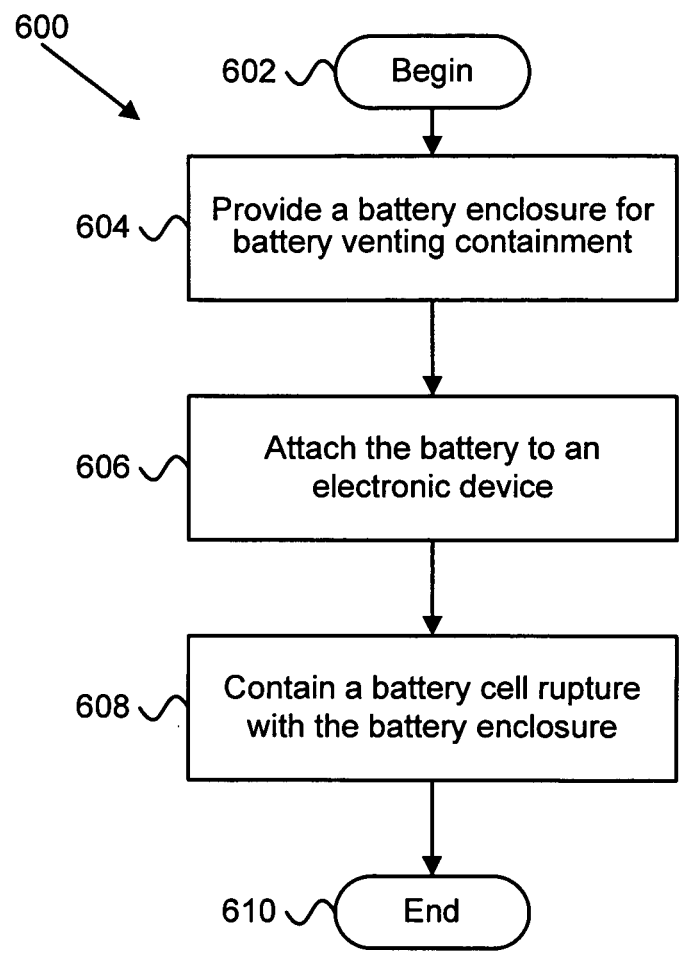
FIG. 6 is a schematic flow chart diagram illustrating one embodiment of a method for providing a battery enclosure for battery venting containment in accordance with the present invention.

FIG. 6 is a schematic flow chart diagram 600 illustrating one embodiment of a method for providing a battery enclosure for battery venting containment in accordance with the present invention. The method begins 602 by providing 604 a battery having a battery enclosure 100 configured to contain emissions from one or more battery cells 102 within the enclosure after a battery cell 102 rupture 202. The battery enclosure 100 includes one or more expandable walls 116. The battery is attached 606 to an electronic device. Upon failure of the case of the battery cells 102, the battery enclosure 100 contains the emissions from the battery cells 102 and the method 600 ends 608.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for battery venting containment, the apparatus comprising:
    a battery enclosure for containing emissions from one or more battery cells within the enclosure upon a rupture of a case of the one or more battery cells, the battery enclosure comprising
        a first side of the battery enclosure that expands upon rupture of the case of the one or more battery cells within the enclosure, wherein the battery enclosure expands to contain the emissions from the rupture and does not contract to a pre-expansion shape;

a sleeve exterior to the first side that directs expansion of the battery enclosure away from a device attached to the battery enclosure;

a second side of the battery enclosure comprising a rigid, the second side comprising a solid substantially planar wall; and an emissions venting mechanism that vents emissions from the battery enclosure.

2. The apparatus of claim 1, wherein the second side rotates along a hinge as the first side expands.

3. The apparatus of claim 1, wherein the battery enclosure is one or more of fire resistant and resistant to explosion of one or more battery cells within the battery enclosure.

4. The apparatus of claim 1, wherein the emissions comprise gases, solids or liquids.

5. The apparatus of claim 1, wherein the battery enclosure is at least partly formed of meta-aramid synthetic fiber.

6. The apparatus of claim 1, wherein the battery enclosure is at least partly formed of para-aramid synthetic fiber.

7. The apparatus of claim 1, wherein the emissions venting mechanism comprises a valve.

8. The apparatus of claim 1, wherein the emissions venting mechanism comprises a restricted orifice.

9. The apparatus of claim 1, wherein the emissions venting device comprises a material porous to at least a portion of the emissions.

10. The apparatus of claim 1, wherein the one or more battery cells comprise high energy battery cells.

11. The apparatus of claim 10, wherein the high energy battery cells are of the group comprising lithium-ion battery cells, nickel cadmium battery cells, and nickel-hydrogen battery cells.

12. The apparatus of claim 1, wherein the battery enclosure further comprises electrical terminals, the electrical terminals connected to the one or more battery cells and extending to the exterior of the battery enclosure, the electrical terminals sealed to the battery enclosure.

13. The apparatus of claim 1, wherein the one or more expandable sides are rolled and are configured to unroll to contain the emissions.

14. An apparatus for battery venting containment, the apparatus comprising:
a battery enclosure for containing emissions from one or more battery cells within the enclosure upon a rupture of a case of the one or more battery cells, the battery enclosure comprising
a first side of the battery enclosure that expands upon rupture of the case of the one or more battery cells within the enclosure, wherein the battery enclosure expands to contain the emissions from the rupture and does not contract to a pre-expansion shape;
a second side of the battery enclosure comprising a rigid side, the second side comprising a solid substantially planar wall;
a third side of the battery enclosure comprising a rigid side, the third rigid side on an opposite side of the battery enclosure relative to the second rigid side and connected to the second rigid side by at least the first expandable side of the enclosure such that the third rigid side moves away from the second rigid side in response to expansion of the enclosure, the third side comprising a solid substantially planar wall; and
an emissions venting mechanism that vents emissions from the battery enclosure.

15. A system for battery venting containment, the system comprising:
an electronic device; and
a battery connected to the electronic device, the battery comprising a battery enclosure for containing emissions from one or more battery cells within the enclosure upon a rupture of the case of the one or more battery cells, the battery enclosure comprising
a plurality of first sides of the battery enclosure that expand upon rupture of the case of the one or more battery cells within the enclosure, wherein the battery enclosure expands to contain the emissions from the rupture and does not contract to a pre-expansion shape;
a sleeve exterior to the plurality of first sides that directs expansion of the battery enclosure away from the electronic device;
a second side of the battery enclosure comprising a rigid side, the second side comprising a solid substantially planar wall, the second side connected to the plurality of first sides, the second side rotating along a hinge as the plurality of first sides expand; and
an emissions venting mechanism that vents emissions from the battery enclosure.

16. The system of claim 15, wherein the battery enclosure is fire resistant.

17. The system of claim 15, wherein the battery enclosure is resistant to explosion of one or more battery cells within the battery enclosure.

18. The system of claim 15, wherein the battery enclosure further comprises electrical terminals, the electrical terminals connected to the one or more battery cells and extending to the exterior of the battery enclosure, the electrical terminals sealed to the battery enclosure.

19. A method for battery venting containment, the method comprising:
providing a battery having a battery enclosure for containing emissions from one or more battery cells within the enclosure upon a rupture of a case of the one or more battery cells, the battery enclosure comprising
a first side of the battery enclosure that expands upon rupture of the case of the one or more battery cells within the enclosure, wherein the battery enclosure expands to contain the emissions from the rupture and does not contract to a pre-expansion shape;
a sleeve exterior to the plurality of first sides to direct expansion of the battery enclosure away from an electronic device;
a second side of the battery enclosure comprising a rigid side, the second side comprising a solid substantially planar wall; and
an emissions venting mechanism that vents emissions from the battery enclosure; and
attaching the battery to the electronic device.

20. The method of claim 19, further comprising containing emissions from a rupture of a case of one or more battery cells within the enclosure.

21. An apparatus for battery venting containment, the apparatus comprising:
means for containing emissions from one or more battery cells within a battery enclosure of a battery upon a rupture of a case of the one or more battery cells, the battery enclosure comprising a first side of the battery enclosure that expands upon rupture of the case of the one or more battery cells within the enclosure, wherein the battery enclosure expands to contain the emissions from the rupture and does not contract to a pre-expansion shape, the battery enclosure comprising a rigid side, the rigid side comprising a solid substantially planar wall, the battery enclosure further comprising an emissions venting mechanism that vents emissions from the battery enclosure; and means for attaching the battery to an electronic device.

* * * * *